J. BAÁN.
LIQUID METER.
APPLICATION FILED JULY 7, 1914. RENEWED DEC. 3, 1917.

1,271,261.

Patented July 2, 1918.

Witnesses:

Inventor:
Johann Baán

UNITED STATES PATENT OFFICE.

JOHANN BAÁN, OF VERBÓ, HUNGARY.

LIQUID-METER.

1,271,261.  Specification of Letters Patent.  Patented July 2, 1918.

Application filed July 7, 1914, Serial No. 849,375. Renewed December 3, 1917. Serial No. 205,239.

*To all whom it may concern:*

Be it known that I, JOHANN BAÁN, residing at Verbó, in the county of Nyitra, Hungary, have invented certain new and useful Improvements Relating to Liquid-Meters, of which the following is a specification.

This invention relates to a device for measuring the quantity of liquid flowing through a pipe and for indicating directly the figures of measurements in units of weight. The apparatus is particularly suitable for use in distilleries, breweries and the like, and in fact anywhere where the quantity of liquid flowing is always subject to variations.

Hitherto, for the purpose of measuring liquids flowing through pipes, vane wheels such as the so-called "Woltmann wings," have been used, these being placed in the pipe line, and caused to turn by the liquid at a higher or lower speed according to the quantity of liquid flowing through the pipes.

If the ratio between the number of revolutions per minute and the speed of the liquid was known then it was possible to ascertain the quantity of liquid flowing through the pipe or pipes by means of the device. Quantities of liquid however, which vary over a very wide range cannot be measured accurately with the measuring devices hitherto known, and as is well known quantities of liquid below a certain limit are not indicated by such a meter at all, as the energy of movement of the liquid no longer suffices to operate the meter. The quantity of liquid which can thus pass unmeasured increases in proportion to the size of the meter.

In distilleries and the like where the quantity of liquid flowing through the pipes fluctuates between very wide limits and where it often only passes through in drops, meters in which the connecting mechanism is operated by the kinetic energy of the liquid are practically useless.

According to the present invention, contrary to the principle of the known meters, the weight of the liquid flowing through and to be measured is employed to drive the vane drum which forms the most important part of the meter, the drum being rotated at a higher or lower speed according to the weight of the quantity of liquid passing through the meter. The revolutions are registered by counting mechanism of a known type, and the number of revolutions, which is in a definite ratio to the quantity of liquid, is read off upon a graduated scale directly in units of weight.

According to the invention the vane drum is preferably in the form of a short cone converging toward the direction of flow of the liquid, the cone being divided into passages by angular blades which are only open on one side. To each passage is connected a pipe bent in the form of a portion of a spiral, the other ends of the pipes terminating in a hollow member provided near the liquid outlet. The angle of inclination of the spiral in which the pipes are wound, is so determined that when the device is of the required length the twist will be about 180°. The vane drum with the pipe system and the hollow member are mounted so as to be easily rotatable and the complete system is rotated by the weight of the liquid flowing on to the blades or into the channels between the blades. By reason of this construction of pipe system the in-flowing liquid cannot pass immediately through the passage it has entered but it can only pass through after having turned the device through a certain angle; after the liquid has passed through the pipe system and the hollow member its quantity can be read in any suitable manner.

In the accompanying drawing is illustrated an example of construction according to this invention.

Figure 4:
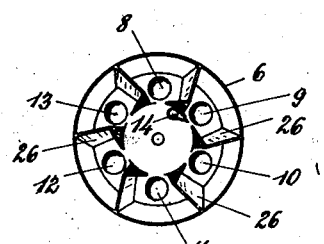
Fig. 4 shows a vertical section of the meter drum.

The drum 6 which is tapered toward the direction of flow of the liquid is secured to a shaft 5 mounted so as to rotate easily for the purpose of reducing the friction as much as possible. One end of the shaft 5 is mounted in the bearing 4 in a standard 2 secured to the base plate 1, while the other end is mounted inside a casing 22. In the interior of the drum 6 are provided angular vanes or blades 26 (Fig. 4) secured to the circumferential wall of the cone 6. These blades form channels or passages closed at the front end, but opening at the rear end into pipes 8, 9, 10, 11, 12, 13. The pipes between the drum 6 and the hollow member 7 are curved spirally, the angle of inclination of the spiral being such that the twist for the required length is about 180°. As will be seen from the drawing the pipe 11, which in the position of the drum 6 shown communicates with the lowermost channel in the drum 6, passes to the highest point of the hollow member 7, while in the same position of the drum the pipe 8 which at one end is connected to the highest channel of the drum 6, terminates at its other end at the lowermost point of the member 7.

Figure 1:
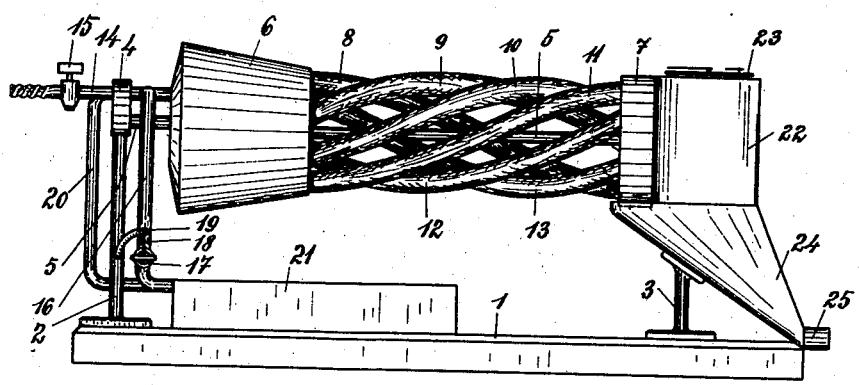
Figure 1 shows a side elevation of the meter.
Figure 2:
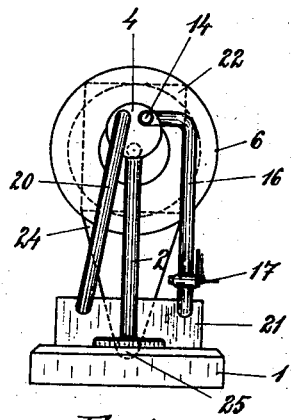
Fig. 2 shows an end view.
Figure 3:
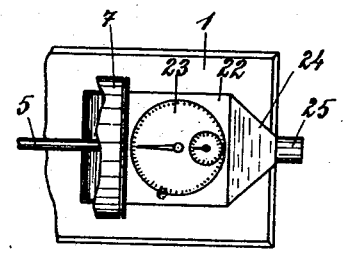
Fig. 3 shows a plan view of the counting mechanism.

The drum 6 has a central opening at its front end, as seen in Fig. 2, and the liquid enters the drum through this opening by the pipe 14 fitted with a cock 15. The pipe 14 reaches to about the middle of the drum and conducts the liquid flowing therefrom into the channel situated immediately to the right thereof, i. e., in the position shown in Fig. 4, to that channel to which the pipe 9 is connected. From the pipe 14 branches a vertical testing pipe 16 fitted with a shut-off cock 17, and having its lower end terminating in a receptacle 21 in the base plate 1. The different positions of the cock 17 are indicated by a pointer 18 moving in front of a scale 19. The cock 17 is so adjusted that only a very small portion of the liquid flowing in the pipe 14 can flow into the receptacle 21. This arrangement is adapted for the purpose of ascertaining the average specific gravity of the liquid flowing through. A pipe 20 leads from the receptacle 21 back to the drum 6 in order to conduct the overflow into the drum 6 when the receptacle 21 is full.

The rotation of the shaft 5 is transmitted in the well known manner to counting mechanism inside the casing 22, on the cover of which graduated dials 23 are provided. The latter are so graduated according to this invention that they directly indicate the quantity of liquid flowing through the drum in units of weight. The liquid is conducted away from the hollow member 7 by a funnel 24 and pipe 25 mounted on the standard 3.

The operation of the apparatus is as follows:

When the cock 15 is opened, the liquid entering through the pipe 14 flows directly into the end of the pipe near the center of the drum into the channel of the blade 26 to the right thereof. The liquid entering this channel cannot however flow out of the drum, as the pipe 9 terminating in this channel extends upward when the drum 6 is in this position, and the liquid cannot flow in this direction. As soon as the channel is filled to a certain extent with liquid, the drum commences to revolve owing to the weight of the liquid in the channel, and the following in-flowing liquid will enter the next following channel. The liquid in the first channel can only flow out when the pipe 9 after passing the lowermost position, rises again until it reaches the position of pipe 13 in Fig. 4, as this pipe is downwardly directed and therefore does not prevent the outflow.

The liquid entering the separate channels therefore drives the drum by its own weight while the energy of motion thereof does not have any action in driving the drum. If the quantity of liquid flowing through is less, then a longer time is required to fill the channels of the drum so that the drum will rotate slower.

The details of construction of the device forming the subject of the invention may be considerably varied without departing from the spirit of the invention.

I claim:

1. In a liquid meter, the combination of a rotatable shaft, a drum secured to the shaft and having longitudinal channels on its inner circumferential wall, a hollow member secured to the shaft, spirally twisted pipes communicating at one end with the channels of the drum and at the other end with said hollow member, and a counting mechanism driven by the shaft of the drum, substantially as and for the purpose described.

2. In a liquid meter, the combination of a rotatable shaft, a drum secured to the shaft and having longitudinal channels on its inner circumferential wall, a hollow member secured to the shaft, spirally twisted pipes communicating at one end with the channels of the drum and at the other end with said hollow member, said pipes having a twist of substantially 180° between their ends, and a counting mechanism driven by the shaft of the drum, substantially as and for the purpose described.

3. In a liquid meter, the combination of a revoluble drum having longitudinal channels on its inner circumferential wall, a supply pipe discharging the liquid into said channels, a closed receptacle, a testing pipe leading from the supply pipe to the closed receptacle, an adjustable cock in the testing pipe, and an overflow pipe leading from the receptacle back to the supply pipe, substantially as and for the purpose described.

In testimony whereof I affix my signature in presence of two witnesses.

JOHANN BAÁN.

Witnesses:
MAX ADLER,
ANDRÉ SALAMONN.